United States Patent [19]

Pizzorno

[11] Patent Number: 4,990,212
[45] Date of Patent: Feb. 5, 1991

[54] DEVICE FOR APPLYING AN ELASTOMERIC FILLER ON THE BEAD CORE OF A PNEUMATIC TIRE

[75] Inventor: Augusto Pizzorno, Milan, Italy

[73] Assignee: Pirelli Coordinamento Pneumatici S.p.A., Milan, Italy

[21] Appl. No.: 352,254

[22] Filed: May 16, 1989

[30] Foreign Application Priority Data

Jun. 8, 1988 [IT] Italy ............................ 20889 A/88

[51] Int. Cl.⁵ ............................................. B29D 30/48
[52] U.S. Cl. ............................. 156/398; 156/136; 156/460; 156/422
[58] Field of Search .............. 156/131, 136, 400, 422, 156/398, 460

[56] References Cited

U.S. PATENT DOCUMENTS

| | | | |
|---|---|---|---|
| 1,476,807 | 12/1923 | Evans et al. | 156/136 |
| 1,890,952 | 12/1932 | Shively | 156/422 |
| 3,477,895 | 11/1969 | Sauer | 156/460 |
| 4,196,036 | 4/1980 | Allen et al. | 156/422 |
| 4,354,892 | 10/1982 | Tarantola et al. | 156/460 |
| 4,795,522 | 1/1989 | Orendorf et al. | 156/460 |

FOREIGN PATENT DOCUMENTS 0858197 1/1961 United Kingdom ............... 156/422

Primary Examiner—Kenneth M. Schor
Assistant Examiner—Todd J. Burns
Attorney, Agent, or Firm—Birch, Stewart, Kolasch & Birch

[57] ABSTRACT

The described device includes a bearing element positioned to engage a bead core and subjected to the action of a friction wheel acting in such a way as to make the bead core rotate around its own axis. Two pressure discs arranged specularly with respect to the lying median plane of the bead core act on opposite sides of a filler to apply the same on the outer peripheral chafer of the bead core while this latter is rotating. The pressure discs lie according to respective planes convergent toward the bead core and divergent in the sense of rotation of the bead core to favor the release of the filler from the pressure discs. The pressure discs are thrust on the filler through a pneumatic cylinder which exerts a constant force on an oscillating support according to an axis parallel to the bead core axis and bearing the discs themselves.

8 Claims, 1 Drawing Sheet

DEVICE FOR APPLYING AN ELASTOMERIC FILLER ON THE BEAD CORE OF A PNEUMATIC TIRE

BACKGROUND OF THE INVENTION

The present invention refers to a device for applying an elastomeric filler on the bead core of a pneumatic tire.

As known, pneumatic tires for motor vehicles in general are always provided, at the bead, with annular elements of metallic material, usually called bead cores, which have mainly the function of supporting the whole pneumatic tire structure.

In fact, each bead core is anchored to the carcass of the pneumatic tire through a turn-up formed by the plies provided in the sidewalls of the tire, folded as a book around the section of the bead core.

In order to prevent the formation of air pockets between the ply skirts turned-up around the bead core, a suitably shaped filler of elastomeric material is provided along the circumferential chafer of the bead core. The filler has also the task of stiffening the structure of the bead.

Known, apparatuses apply the filler on the bead core in a completely automatic manner.

To this end, these apparatuses use devices in which the filler, previously cut as a strip of suitable length, is tangentially inserted between two coaxially facing pressure discs that, rotating, apply the strip along the circumferential outer chafer of the bead core while this latter, mounted on a suitable bearing element, is rotated around its own axis. Subsequently, a splicing device operates in such a way as to join the opposite ends of the filler that mutually face each other according to a "V" configuration in consequence of the difference of diameters according to which the lower and upper zones of the section of the filler are bent.

In the devices used at present for applying the filler, the bead core is pulled into rotation by one of the pressure discs. In fact, the pressure discs are rotated by a motor, and one of them has a peripheral portion acting against the bearing element of the bead core to pull it into rotation together with the bead core mounted thereon.

Moreover, it is provided that the pressure discs engage the filler through respective perimetric projections obtained on the front of the same so as to be placed into contact on opposite sides of the filler itself, in proximity of the base portion of this latter. The perimetric projections are spaced in a measure slightly smaller than the width of the filler section in the zone where the projections must make contact. Therefore, when the filler is obliged to pass between the pressure discs 14 suffers such a compression on the sides as to produce a force of reaction that thrusts the filler itself against the outer peripheral surface of the bead core, on which a suitable solution has been previously distributed for providing the adhesion of the filler.

From the foregoing it is noted that the known devices for applying the filler reveal some drawbacks.

A first drawback consists in the fact that the filler tends to be lifted from the bead core when it is being released from the pressure discs. In fact, owing to the mutual arrangement of the above said perimetric projections, the filler is compressed on the sides when it is inserted between the pressure discs and, therefore, it exerts on the perimetric projections an elastic reaction that makes it adhere to the projections themselves.

Consequently, the filler is inclined to be removed from the bead core at the points in which the perimetric projections move away from the bead core in consequence of the rotation of the pressure discs. All this can produce several complications in the case in which, for instance, owing to a not so perfect distribution of the solution on the bead core or, in the case in which the solution is not qualitatively satisfactory, the filler should remain attached to the pressure discs instead of adhering to the bead core. In any case, the described solution is not at all favorable for a correct application of the filler on the bead core.

Another drawback is given by the fact that the pressure discs, in order to pull into rotation the bead core, must necessarily be maintained immovable with respect to the bearing element. This determines an irregular application of the filler when, as often happens, the latter has slight dimensional variations of its section. In particular, when the filler has a section of a measure slightly greater than the nominal one, it is subject to suffer an excessive compression when inserted between the pressure discs. This compression may cause an undesirable elongation of the filler along the zones adjacent to its base.

If, on the other hand, the filler has a section of a measure slightly smaller than the nominal one, it may happen that the filler is not sufficiently compressed on the bead core during its application. This may cause a not so perfect adhesion of the filler on the bead core.

Another drawback derives from the fact that the pulling of the bearing element by the corresponding pressure disc takes place according to contact profiles that, nearly always, have radii different from the radius of the outer circumferential chafer of the bead core and from the radius of the perimetric projections positioned to pull the filler. The result is that often the pressure discs pull the filler at a speed different from the speed of the outer perimetric chafer of the bead core, on which the filler leans. This situation, besides not being favorable for a good adhesion of the filler to the bead core, may cause undesirable structural deformations of the filler in its sense of longitudinal development.

SUMMARY OF THE INVENTION

The main object of the present invention is substantially that of eliminating the drawbacks of the above known techniques, by providing a device able to apply the filler on the bead core in a very reliable manner without giving rise to deformations of the filler, also in case the bead core has, originally, slight dimensional variations in its cross section.

This aim and other ones, that will better appear in the present description, are substantially achieved by means of a device for applying an elastomeric filler on the bead core of a pneumatic tire, characterized in that pressure discs are made rotatably idle and released from the driving means and lie according to respective planes which diverge the one with respect to the other in the sense of rotation of the bead core during the application of the filler and converge mutually in the direction of the axis of rotation of the bead core. That is, the device of the present invention for applying an elastomeric filler to the bead core of a pneumatic tire comprises a support frame, a bearing element rotatably engaged with respect to the frame and positioned to engage rigidly and releasably the bead core of a pneumatic tire, a pair of pressure discs rotatably borne with respect to the frame, positioned symmetrically with respect to the lying median plane of the bead core and having respective mutually facing perimetric projections which act on opposite sides of an elastomeric filler for its application, by a thrust action toward the bead core, along a circumferential outer chafer of the bead core while the latter is rotating around its own axis through actuation means working on the bearing element.

BRIEF DESCRIPTION OF THE DRAWINGS

Further characteristics and advantages will appear from the detailed description given hereinbelow, but not limited thereto, for applying an elastomeric filler on the bead core of a pneumatic tire, according to the present invention, made with reference to the attached sheet of drawing, supplied only by way of non-limiting example, in which.

DETAILED DISCUSSION OF THE INVENTION

Figure 1:
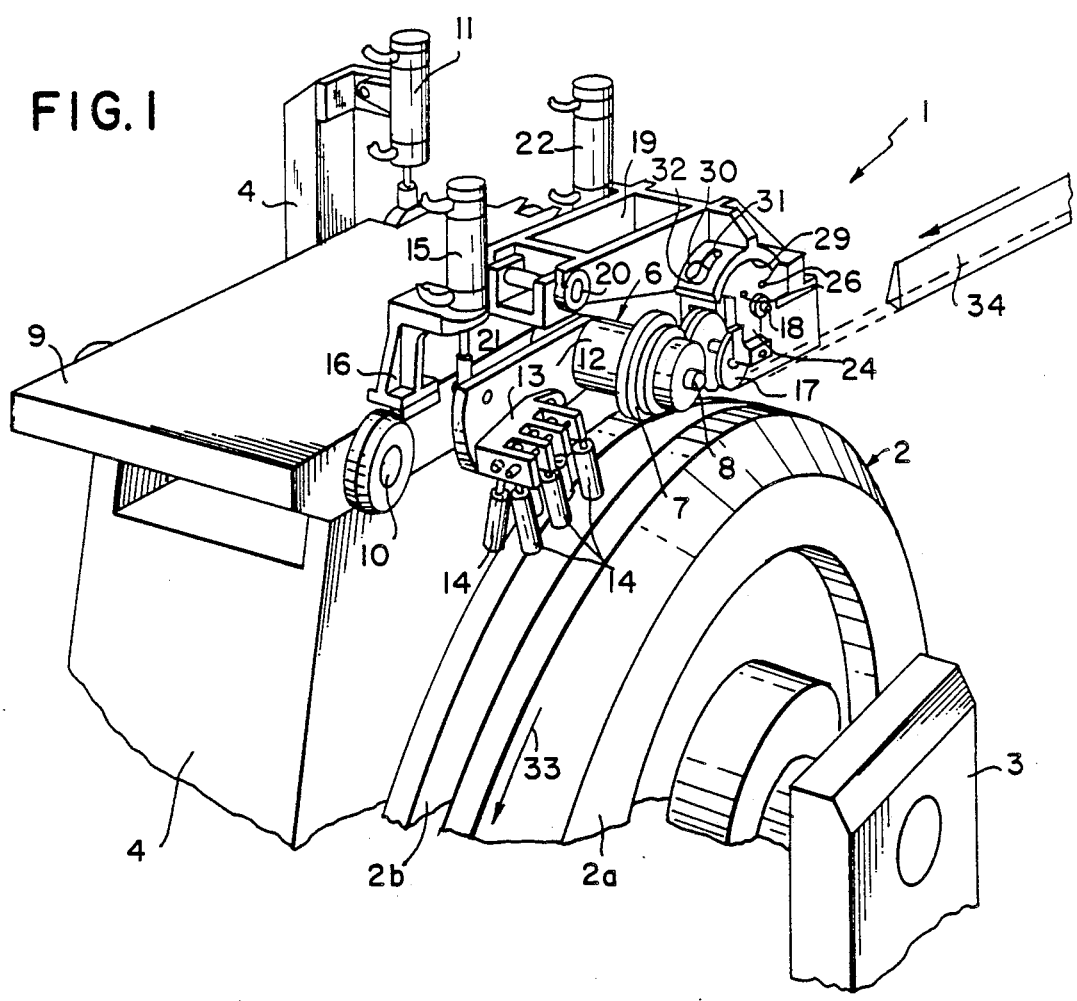
FIG. 1 is a broken perspective view of the device according to the present invention.

With particular reference to FIG. 1, reference numeral 1 indicates a device for applying an elastomeric filler on the bead core of a pneumatic tire, according to the present invention.

In a well known way, the device 1 is preferably associated with an apparatus, not shown as of no importance for the purposes of the invention, which is suitable for applying elastomeric fillers on bead cores in a completely automatic manner.

The device 1 comprises a bearing element 2 (shown only in part) rotatably engaged with an arm 3 connecting the latter with a supporting frame 4.

The bearing element 2, in a known way, comprises a centering disc 2a positioned to engage a bead core 5 of a pneumatic tire (FIG. 2) to which a fastening flange 2b is associated, the flange being translatable when approaching the disc to provide the fastening of the bead core 5 to the pneumatic tire.

Always in a known way, it is preferably provided that the arm 3, rotatably supporting the bearing element 2, results on its turn to be rotatably connected with the supporting frame 4, together with other like arms, to subject the bead core 5 to the next action of the various devices provided in the above mentioned apparatus.

On the bearing element 2 there are driving means 6 able to rotate the bearing element itself so that the bead core 5 is pulled into rotation around its own axis. Originally, the driving means 6 comprises a friction wheel 7 rotatably engaged with respect to the frame 4 according to an axis parallel to the axis of the bearing element 2. The friction wheel 7 is pulled into rotation by a drive shaft 8 through a motor (not shown), and is kept in contact against the peripheral edge of the flange 2b to transmit its own rotary motion to the latter, and therefore to the entire bearing element 2.

To this end, as clearly shown in FIG. 1, it is advantageously provided that the friction wheel 7 is rotatably borne, through the drive shaft 8, by a plate 9 hinged in an oscillating manner to the supporting frame 4 through at least a pin 10 whose axis is substantially parallel to the axis of the drive shaft 8. A first fluid mechanics control double-acting cylinder 11, fixed with respect to the supporting frame 4, acts on the plate 9 so that the friction wheel 7 is thrust against the flange 2b with a predetermined force, necessary to guarantee the pulling into rotation of the bearing element 2 and the elements connected thereto.

Moreover, it is advantageously provided that the drive shaft 8 of the friction wheel 7 crosses rotatably a supporting plate 12 engaged with a small block 13, which bears a plurality of orientation rollers 14, known and conventional, whose function will be discussed later on. A positioning fluid mechanics double-acting cylinder 15, rigidly connected through a support 16 with the plate 9, works on the supporting plate 12 in such a way that the rollers 14 are thrust with a light load toward the bearing element 2 during the filler application.

Moreover, the device 1 comprises a pair of pressure discs 17 and 18 rotatably borne with respect to the supporting frame 4, symmetrically arranged with respect to the median lying plane of the bead core 5 and provided with respective mutually facing perimetric projections 17a, 18a.

Originally and advantageously, in accordance with the present invention, the pressure discs 17, 18 are rotatably idle and completely released from the driving means 6. Moreover, they are mounted in a very particular way with respect to the above median lying plane of the bead core 5.

Figure 2:
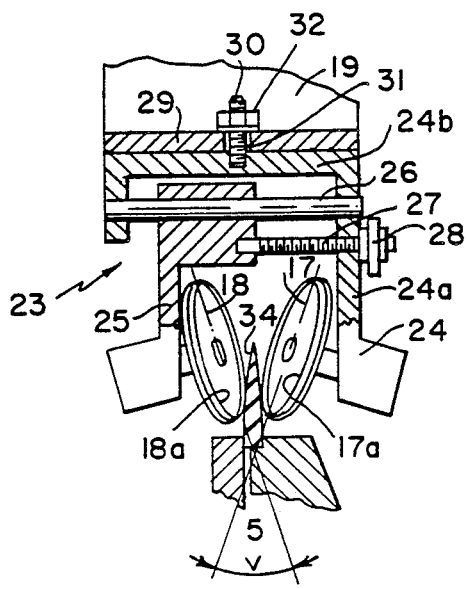
FIG. 2 shows in front view and in partial section, a pair of pressure discs making up part of the device of the invention, during the application of an elastomeric filler on the bead core.

The discs lie according to respective planes that converge toward the axis of the bearing element of the bead core, as shown in FIG. 2, in which the device bearing the discs is illustrated at the same point of observation from which one looks at FIG. 1, i.e. on the front, with the elastomeric filler 34, on approaching the observer, as indicated by the arrow F.

The opening angle "v" of the planes, of the order of about 10°, preferably comprised between 5° and, 15° and of course, with suitable adjusting devices can be made variable instead of fixed, as shown in FIG. 1.

In consequence of the arrangement above the pair of discs has a zone of minimum mutual distance, the zone defined by a point P on the edge of each disc in a facing position and opposite to the same point P of the other disc, and it is the zone where the filler 34 suffers the maximum compression between the discs, any other condition being the same.

Then, in order to avoid the already mentioned action of tearing from the bead core that the filler suffers in consequence of the rotation of the pressure discs after leaving the tangent point T between the pressure discs and the bearing element of the bead core, in accordance with the invention, the common axis passing through the centers of rotation of the two pressure discs is moved in the sense of rotation of the drum 2 so that the point P of minimum distance between the pressure discs no longer coincides with the tangent point T between the discs and the drum, but is moved backwards (in the sense of rotation) with respect to the above tangent point T.

Figure 3:
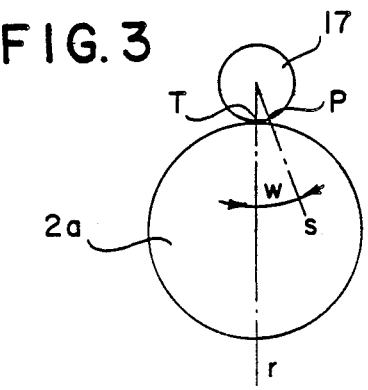
FIG. 3 shows in lateral view and schematically, the mutual arrangement between the pressure discs and the bearing element of the bead core.

This movement, shown diagrammatically in FIG. 3, is defined by the angle "w" between the diameters "r" and "s" of each disc, passing through point P and T, respectively. The value of the above angle "w" is conveniently comprised in an interval of more or less 10° with a preferred value of 15°.

Substantially, in consequence of the structural arrangement of the various elements of the device according to the invention, the two pressure discs lie according to respective planes which mutually diverge in the sense of rotation of the bead core 5 during the application of the filler (i.e. with reference to FIG. 2, perpendicularly to the sheet in direction of the observer) and converge one with respect to the other toward the bead core itself.

Moreover, it is provided that the pressure discs 17, 18 are borne by an oscillating support 19, hinged in an oscillating manner with respect to the supporting frame 4 according to an axis parallel to the axis of the bead core 5. Preferably, the oscillating support 19 is connected, through a pin 20, with a bracket 21 secured to the plate 9 that supports the friction wheel 7.

Between the plate 9 and the oscillating support 19 there is a double-acting actuator cylinder 22 which thrusts the pressure discs 17, 18 toward the bead core 5 with a force of constant and predetermined value.

As clearly schematized in FIG. 2, the illustrated example provides that the adjusting means 23 be associated with the pressure discs 17, 18 to permit varying the mutual distance and the orientation around an axis parallel to the axis of the bead core 5.

To this end it is provided that a first pressure disc 17 is rotatably engaged with a supporting bracket 24 connected in the lower part with the oscillating support 19, while the second pressure disc 18 is rotatably borne by a mobile small block 25 slidably engaged along at least a guiding rod 26 rigidly mounted on a supporting bracket 24 and extending parallel to the axis of the bead core 5. A threaded bar 27 extending parallel to the guiding rod 26 and crossing in a sliding manner a reference wall 24a of the supporting bracket 24 is secured to the mobile small block 25. An adjusting hand grip 28 engaged during working with the threaded bar 27 and pulled into rotation manually to vary the distance between the pressure discs 17, 18 is rotatably connected with the reference wall 24a.

Advantageously the supporting bracket 24 has a top wall 24b of curvilinear shape which is secured under an arcuate plate 29 integral with the oscillating support 19. The arcuate plate 29, countershaped to the top wall 24b, is configured around an axis parallel to the axis of the bead core 5 and is arranged substantially at the level of the axis of the pressure discs 17 and 18. The top wall 24b is preferably engaged with the arcuate plate 29 through at least a threaded piston-pin 30 which crosses in a sliding manner a respective opening 31 obtained in the arcuate plate to be engaged with a threaded nut 32 suitale for fixing the positioning of the supporting bracket 24.

By unloosing the nut 32 and moving the piston-pin along the opening 31 it is advantageously possible to place the bracket 24 around the center of curvature of the arcuate plate 29 and in such a way, to adjust simultaneously the orientation of the pressure discs 17 and 18 around an axis parallel to the axis of the bead core 5, for instance around the common axis passing through the centers of rotation of the discs 17 and 18, i.e. to vary the value of the angle "w".

Following the engagement of the bead core 5 between the centering disc 2a and the fastening flange 2b, the friction wheel 7, thrust against the peripheral edge of the flange itself by the action of the fluid-mechanics cylinder 11, is pulled into rotation so as to determine the pulling of the bead core with a rotary motion in the sense of the arrow 33 of FIG. 1.

Contemporaneously, the elastomeric filler 34, in the form of a strip, is inserted, through a known and therefore not illustrated feeding means, between the pressure discs 17, 18 and the bead core 5, as shown in FIG. 2.

More particularly, the filler 34 having a section substantially triangular at a quite accentuated height, is engaged between the perimetric projections 17a, 18a of the pressure discs 17, 18 such that, placed at a predetermined distance from one another through the adjusting means 23 and thrust toward the bead core 5 by the action of the second cylinder 22, contact the sides of the filler in proximity of the base of the same, so that the filler is thrust, with its base, against the perimetric outer chafer of the bead core 5, on which an adhesive solution has been previously distributed.

Therefore, the filler 34 adheres to the bead core 5 and is pulled by the latter into the rotation given by the friction wheel 7. While the filler 34 is dragged by the bead core 5, the same passes through the pressure discs 17 and 18 which apply it on the bead core and, consequently, through the orientation rollers 14 which, in a known way, are oriented in such a way as to oblige the filler itself to effect an undulated path. On following this path, the filler suffers repeated deformations, especially in the zones farthest from the bead core 5, talking care that the filler itself maintains a symmetric orientation with respect to the median plane of the bead core 5.

Advantageously, the mutual orientation of the pressure discs 17 and 18 is such that the distance between the perimetric projections 17a, 18a in the zones of contact with the filler 34 increases progressively in the sense of rotation of the bead core 5. Therefore, the elastic reactions of the filler on the perimetric projections 17a, 18a, consequent to the compression exerted on the sides of the filler by the pressure discs 17, 18 will result in the defined zones in which the initial insertion of the filler between the pressure discs takes place. On the contrary, these elastic reactions will reduce progressively up to being eliminated near the zone in which the filler 34, now applied on the bead core 5, disengages from the pressure discs 17 and 18. The possibility that the filler 34 moving away from the bead core 5 is dragged by friction into the zones in which the perimetric projections 17a, 18a rotating around the axis of the respective pressure discs 17, 18 move away from the bead core 5, is thus eliminated. Moreover, and advantageously, as the force by which the pressure discs 17 and 18 act on the filler 34 is due to the action of the actuator cylinder 22, this force can maintain a predetermined and constant value even if the section of the filler 34 should have slight dimensional variations at the various points of its longitudinal configuration.

This eliminates the possibility of structural deformations of the filler or an ineffective application of the same on the bead core in consequence of the above dimensional variations of the section of the filler.

The present invention achieves thus the aimed purposes.

As described above, it is noted that the device forming the object of the invention is able to eliminate the drawbacks of the known techniques, permitting an effective and reliable application of the filler on the bead core, without producing any structural and/or dimensional variation on the filler itself.

To this end, it is also considered that, as the pressure discs 17 and 18 are entirely released from the driving means 6, the device of the invention is also able to guarantee that the pulling of the filler 34 takes place at a speed exactly identical to the peripheral speed of the bead core 5.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

I claim:

1. A device for applying an elastomeric filler on a bead core of a pneumatic tire comprising:
    a supporting frame;
    a bearing element rotatably engaged with respect to said frame and positioned to engage rigidly and releasably a bead core of a pneumatic tire; and
    a pair of pressure discs rotatably supported with respect to said frame, and positioned such that they will apply said elastomeric filler to said core, said pair of pressure discs being arranged symmetrically with respect to a median lying plane of said bead core and having respective perimetric projections mutually facing which act on opposite sides of an elastomeric filler to apply said filler, along an outer circumferential chafer of said bead core while said bead core is rotated around its own axis, a driving means for rotating said core about its axis, said driving means working on said bearing element, said pressure discs being rotatably idle and released from said driving means, said pressure disc according to respective planes that diverge one with respect to the other toward the direction of advances of said bead core in a zone of maximum compression imparted to said filler and which converge mutually in a direction toward the axis of rotation of said bead core.

2. The device according to claim 1, wherein said pressure discs are engaged by an oscillating support hinged with respect to said supporting frame according to an axis parallel to the axis of rotation of said bead core and on which oscillating support at least a fluid mechanics cylinder acts to thrust, with a predetermined and constant force, said pressure discs toward said bead core.

3. The device according to claim 2, wherein said pressure discs are connected to said oscillating support through a supporting bracket having a top wall of curvilinear shape engaged with an arcuate plate said arcuate plate being integral with said oscillating support and countershaped to said top wall of said supporting bracket, said supporting bracket being positioned around the center of curvature of said arcuate plate to adjust simultaneously the orientation of said pressure discs around an axis parallel to the axis of rotation of said bead core.

4. The device according to claim 3, wherein said axis parallel to said axis of rotation of said bead core is a common axis passing through the centers of rotation of said discs, said orientation with respect to said axis being adjustable to an interval of 25°.

5. The device according to claim 2, wherein a first of said pressure discs is rotatably engaged with a fixed supporting bracket secured to said oscillating support and a second of said pressure discs is rotatably engaged with a moveable supporting bracket engaged in a sliding manner along at least a guiding rod integral with said fixed supporting bracket and said guiding rod extending parallel to the axis of rotation of said bead core, a threaded bar being associated with said moveable supporting bracket and extending parallel to said guiding rod and crossing in a sliding manner said fixed supporting bracket to be engaged during working with an adjusting hand grip rotatably connected with said fixed supporting bracket, said hand grip being capable of being pulled into rotation to adjust the distance between said pressure discs.

6. The device according to claim 5, wherein said driving means comprises a friction wheel pulled into rotation and working against a peripheral edge of said bearing element to pull into rotation said bead core.

7. The device according to claim 6, wherein said friction wheel is rotatably engaged with a plate hinged to said supporting frame according to an axis parallel to the axis of rotation of said bead core and on which at least a fluid mechanics cylinder acts to thrust said friction wheel against said bearing element of said bead core.

8. The device according to claim 1, wherein planes perpendicular to the rotational axis of said pressure discs converge at an angle ranging from 5° to 15°.

* * * * *